(12) United States Patent
Lee et al.

(10) Patent No.: US 11,845,354 B2
(45) Date of Patent: Dec. 19, 2023

(54) DEVICE AND METHOD FOR PROVIDING INFORMATION FOR HYBRID ELECTRIC VEHICLE

(71) Applicants: Hyundai Motor Company, Seoul (KR); Kia Corporation, Seoul (KR)

(72) Inventors: Sueng Ho Lee, Seoul (KR); Byung Hoon Yang, Seongnam-si (KR); Jeong Soo Park, Cheongju-si (KR); Dae Won Yang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 278 days.

(21) Appl. No.: 17/355,994

(22) Filed: Jun. 23, 2021

(65) Prior Publication Data
US 2022/0126722 A1 Apr. 28, 2022

(30) Foreign Application Priority Data
Oct. 28, 2020 (KR) .......................... 10-2020-0141553

(51) Int. Cl.
*B60L 53/64* (2019.01)
*B60L 58/12* (2019.01)
*B60L 50/61* (2019.01)

(52) U.S. Cl.
CPC .............. *B60L 53/64* (2019.02); *B60L 50/61* (2019.02); *B60L 58/12* (2019.02); *B60L 2250/16* (2013.01)

(58) Field of Classification Search
CPC .......... B60L 53/64; B60L 50/61; B60L 58/12; B60L 2250/16; B60L 50/16; B60L 53/665; B60L 2240/60; Y02T 10/62; Y02T 10/70; Y02T 10/7072; Y02T 90/12; Y02T 90/16; Y02T 90/167; Y04S 30/14; Y04S 10/126; B60W 50/14; B60W 10/06; B60W 10/08; B60W 10/26; B60W 20/15; B60W 2050/146; B60W 20/13; B60W 2050/0005; B60W 2556/50; B60K 35/00; B60K 2370/152; B60K 2370/166; B60K 2370/169; B60Y 2200/92
USPC ........................................................ 320/137
See application file for complete search history.

(56) References Cited

U.S. PATENT DOCUMENTS

| 2010/0138093 A1* | 6/2010 | Oku ........................ | B60L 53/64 |
| | | | 180/65.265 |
| 2014/0200793 A1* | 7/2014 | Dufford .................. | G01F 9/023 |
| | | | 701/101 |

* cited by examiner

*Primary Examiner* — Paul Dinh
(74) *Attorney, Agent, or Firm* — Slater Matsil, LLP

(57) ABSTRACT

An embodiment device for providing information for a hybrid electric vehicle includes a display device, a non-transitory memory, and a processor connected to the display device and the non-transitory memory, wherein the processor is configured to obtain travel distance information, fuel information, and battery information of the vehicle, and output, on the display device, battery charging proposal information based on at least one of an energy injection cost, a consumable replacement period, or energy balancing using the travel distance information, the fuel information, and the battery information of the vehicle.

20 Claims, 9 Drawing Sheets

DEVICE AND METHOD FOR PROVIDING INFORMATION FOR HYBRID ELECTRIC VEHICLE

CROSS-REFERENCE TO RELATED APPLICATIONS

This application claims the benefit of Korean Patent Application No. 10-2020-0141553, filed in the Korean Intellectual Property Office on Oct. 28, 2020, which application is hereby incorporated herein by reference.

TECHNICAL FIELD

The present disclosure relates to a device and a method for providing information for a hybrid electric vehicle.

BACKGROUND

As interest in environmental issues increases, research for improving fuel efficiency and developing eco-friendly vehicles is being made more actively. The eco-friendly vehicles include a hybrid electric vehicle (HEV), a plug-in hybrid electric vehicle (PHEV), an electric vehicle (EV), a fuel cell electric vehicle (FCEV), and the like. Among those, the plug-in hybrid electric vehicle is more fuel-efficient than the hybrid electric vehicle because the plug-in hybrid electric vehicle drives a motor or a fuel engine using electric energy charged in a battery after charging the battery with an external power supply. However, the plug-in hybrid electric vehicle has a short electric mode travel distance compared to an engine mode travel distance during actual travel because the battery electric charging is inconvenient compared to fuel injection caused by insufficient electric charging infrastructure.

SUMMARY

An embodiment of the present disclosure provides a device and a method for providing information for a hybrid electric vehicle that provides battery charging proposal information based on an energy injection cost, a consumable inspection period, and/or energy balancing for balanced use of a motor and an engine in the hybrid electric vehicle.

The technical problems to be solved by the present inventive concept are not limited to the aforementioned problems, and any other technical problems not mentioned herein will be clearly understood from the following description by those skilled in the art to which the present disclosure pertains.

According to an embodiment of the present disclosure, a device for providing information for a hybrid electric vehicle includes a display device, a non-transitory memory, and a processor connected to the display device and the non-transitory memory, and the processor obtains travel distance information, fuel information, and battery information of the vehicle, and outputs, on the display device, battery charging proposal information based on at least one of an energy injection cost, a consumable replacement period, and/or energy balancing using the obtained information.

In one implementation, the processor may calculate a fuel injection cost for each unit distance using an engine-used travel distance, and a residual fuel amount and a fuel injection price included in the fuel information.

In one implementation, the processor may calculate an electric charging cost for each unit distance using a motor-used travel distance, and a state of charge of a battery and an electric charging price included in the battery information.

In one implementation, the processor may calculate a total energy injection cost for each unit distance using a total travel distance of the vehicle, the fuel injection cost, and the electric charging cost.

In one implementation, the processor may determine a target total energy injection cost based on the fuel injection cost, calculate an additional motor-used travel distance for achieving the target total energy injection cost, and calculate a recommended number of battery charging using the additional motor-used travel distance and a travelable distance in a battery full-charged state.

In one implementation, the processor may obtain a national average fuel injection price and a national average electric charging price provided from a vehicle management server.

In one implementation, the processor may obtain the fuel injection price included in gas station information and the electric charging price included in charging station information in association with a navigation system.

In one implementation, the processor may obtain the fuel injection price and the electric charging price included in a payment history provided from a financial institution server.

In one implementation, the processor may display a replacement period of an engine-related consumable based on an engine-used travel distance, display a replacement period of a motor-related consumable based on a motor-used travel distance, and quantify and display how advantageous travel using a motor is compared to travel using an engine in terms of the replacement periods of the engine-related consumable and the motor-related consumable.

In one implementation, the processor may calculate a first ratio of engine fuel injection energy to vehicle total input energy, calculate a second ratio of motor electric input energy to the vehicle total input energy, and compare the first ratio and the second ratio with each other, and display information indicating that additional battery charging is required based on a difference between the first ratio and the second ratio when the first ratio is greater than the second ratio.

In one implementation, the processor may reflect predetermined weights respectively to an energy injection cost-based recommended number of battery charging, a consumable replacement period-based recommended number of battery charging, and an energy balancing information-based recommended number of battery charging to calculate an average value, and display the calculated average value as a recommended number of battery charging.

According to another embodiment of the present disclosure, a method for providing information for a hybrid electric vehicle includes obtaining, by a processor, information, wherein the information includes travel distance information, fuel information, and battery information, and outputting, by the processor, battery charging proposal information based on at least one of an energy injection cost, a consumable replacement period, and/or energy balancing using the obtained information.

In one implementation, the obtaining of the information may include measuring an engine-used travel distance, a motor-used travel distance, and a total travel distance using a travel distance measurement device, obtaining a residual fuel amount of the fuel information and a state of charge of a battery of the battery information, and obtaining a fuel injection price of the fuel information and an electric charging price of the battery information.

In one implementation, the obtaining of the fuel injection price and the electric charging price may include obtaining a national average fuel injection price and a national average electric charging price provided from a vehicle management server.

In one implementation, the obtaining of the fuel injection price and the electric charging price may include obtaining the fuel injection price included in gas station information and the electric charging price included in charging station information in association with a navigation system.

In one implementation, the obtaining of the fuel injection price and the electric charging price may include obtaining the fuel injection price and the electric charging price included in a payment history provided from a financial institution server.

In one implementation, the outputting of the battery charging proposal information may include calculating a fuel injection cost for each unit distance using the engine-used travel distance, the residual fuel amount, and the fuel injection price, calculating an electric charging cost for each unit distance using the motor-used travel distance, the state of charge of the battery, and the electric charging price, and calculating a total energy injection cost for each unit distance using the total travel distance, the fuel injection cost, and the electric charging cost.

In one implementation, the outputting of the battery charging proposal information may further include determining a target total energy injection cost based on the fuel injection cost, calculating an additional motor-used travel distance for achieving the target total energy injection cost, and calculating a recommended number of battery charging using the additional motor-used travel distance and a travelable distance in a battery full-charged state.

In one implementation, the outputting of the battery charging proposal information may include displaying a replacement period of an engine-related consumable based on the engine-used travel distance, displaying a replacement period of a motor-related consumable based on the motor-used travel distance, and quantifying and displaying how advantageous travel using a motor is compared to travel using an engine in terms of the replacement periods of the engine-related consumable and the motor-related consumable.

In one implementation, the outputting of the battery charging proposal information may include calculating a first ratio of engine fuel injection energy to vehicle total input energy, calculating a second ratio of motor electric input energy to the vehicle total input energy, and comparing the first ratio and the second ratio with each other, and displaying information indicating that additional battery charging is required based on a difference between the first ratio and the second ratio when the first ratio is greater than the second ratio.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
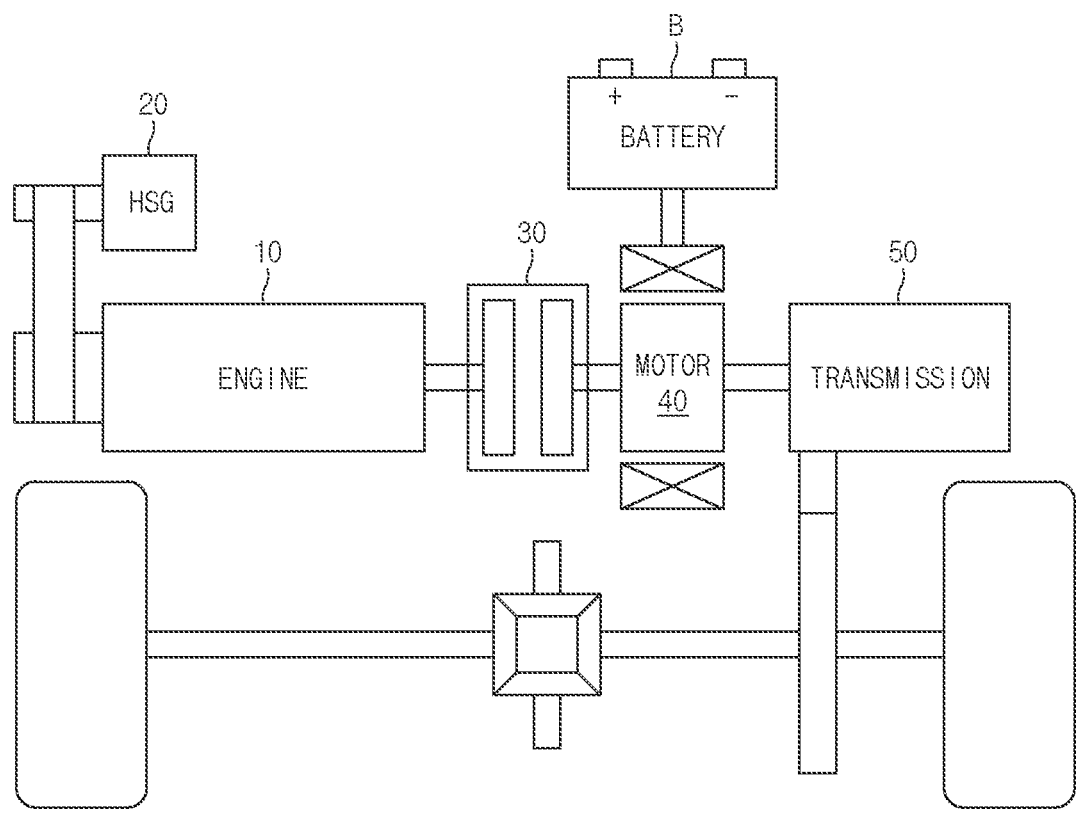
FIG. 1 is a block diagram illustrating a hybrid electric vehicle related to embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of well-known features or functions will be omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a hybrid electric vehicle related to embodiments of the present disclosure.

Referring to FIG. 1, a hybrid electric vehicle may include an engine 10, a hybrid starter generator (HSG) 20, an engine clutch 30, a motor 40, and a transmission 50.

The engine 10 generates power (an engine torque) required to drive the vehicle by burning fuel (e.g., gasoline, diesel, or the like). As the engine 10, various known engines such as a gasoline engine, a diesel engine, or the like may be used. The engine 10 controls an output torque (that is, the engine torque) in response to a command of an engine management system (EMS).

The HSG 20 may be mounted on the engine 10 and crank the engine 10 to start the engine 10. The HSG 20 may generate electrical energy by operating as a generator in the state in which the engine 10 is started. The electrical energy generated by the HSG 20 may be used to charge a battery "B".

The engine clutch 30 is disposed between the engine 10 and the motor 40 to regulate the power (the output torque) of the engine 10. The engine clutch 30 may transmit or block, to a driving wheel (a wheel), the power (the engine torque) generated by the engine 10 through engagement or disengagement.

The motor 40 receives electric power from the battery "B", generates power (motor power), and transmits the power to the driving wheel. The motor 40 may control an output torque (a motor torque) of the motor 40 by changing a rotation direction and a revolution per minute (RPM) in response to a command of a motor control unit (MCU). The motor 40 may be used as the generator for charging the battery "B" by generating a counter electromotive force (regenerative energy) when a state of charge (SOC) of the battery is insufficient or during regenerative braking. The battery "B", which serves to supply the electric power required for the vehicle driving, is implemented as a high voltage battery. The battery "B" may be charged by external electric power. An electric power converter (not shown) may be disposed between the motor 40 and the battery "B". The electric power converter (not shown) may convert a voltage output from the battery "B" into a motor driving voltage and supply the motor driving voltage. The electric power converter (not shown) may be implemented as a DC-DC converter, an inverter, or the like.

The transmission 50 converts at least one of the motor torque and/or the engine torque in a shift ratio matching a shift stage (a gear stage) and outputs the converted torque. The transmission 50 may be implemented as a double clutch transmission (DCT). The transmission 50 changes the shift stage in response to a command of a transmission control unit (TCU). The TCU may determine an optimal shift stage based on information such as a travel speed of the vehicle (that is, a vehicle speed or a wheel speed), an accelerator pedal position, an engine rotation speed and/or clutch travel obtained through sensors in the vehicle.

Such a hybrid electric vehicle may be a plug-in hybrid electric vehicle (PHEV). Travel modes of the hybrid electric vehicle may be classified into an engine mode in which the vehicle travels using only the engine 10, an electric mode (an EV mode) in which the vehicle travels using only the motor 40, and a hybrid mode (a HEV mode in which the vehicle travels using the engine 10 and the motor 40).

In the above embodiment, the configuration in which the engine 10 and the motor 40 are connected to each other in the hybrid electric vehicle is described as an example, but the embodiments of the present disclosure may not be limited thereto and may be implemented with a configuration in which the engine 10 and the motor 40 are not connected to each other. For example, an embodiment of the present disclosure may be implemented such that a front wheel is driven by an engine system and a rear wheel is driven by a motor system.

Figure 2:
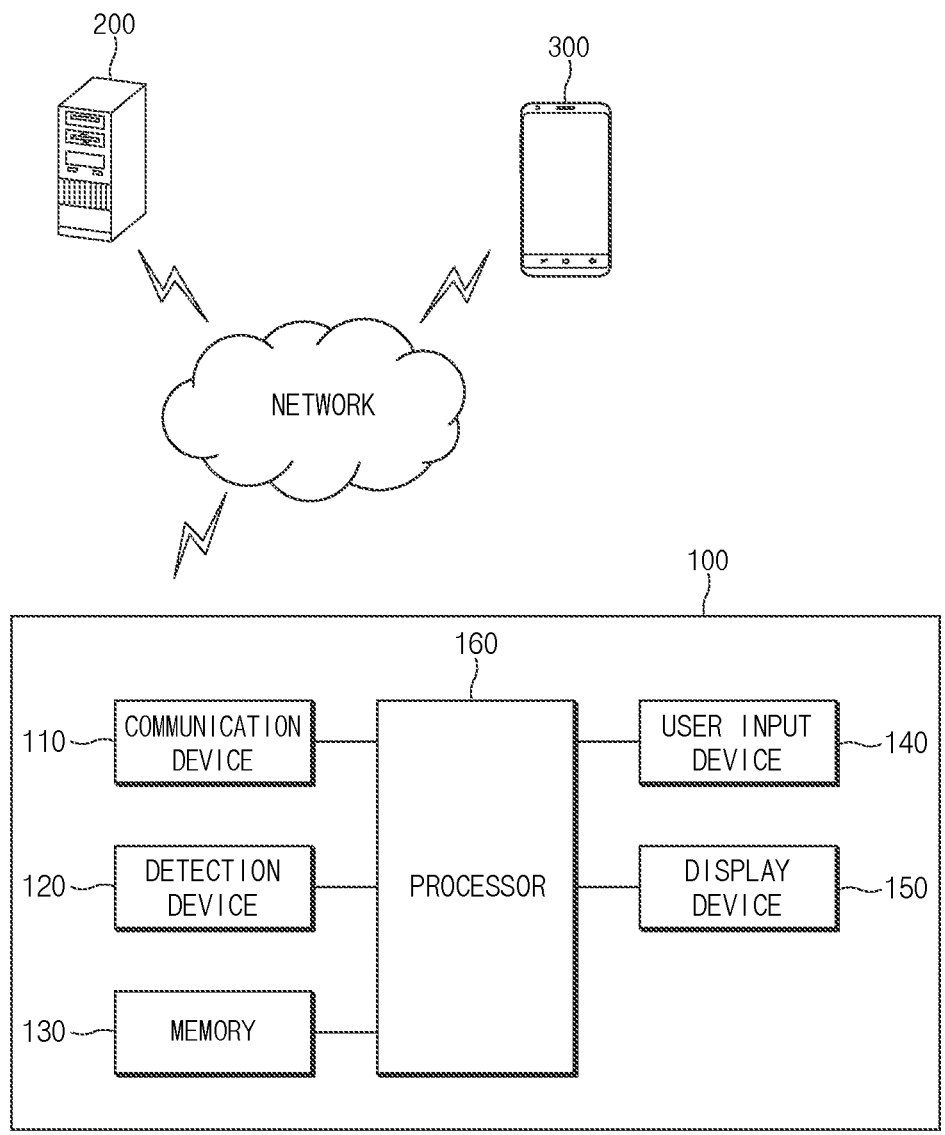
FIG. 2 is a block diagram illustrating a device for providing information for a hybrid electric vehicle according to embodiments of the present disclosure.

FIG. 2 is a block diagram illustrating a device for providing information for a hybrid electric vehicle according to embodiments of the present disclosure.

A hybrid electric vehicle information providing device wo (hereinafter, an information providing device) may be mounted on the hybrid electric vehicle (hereinafter, the vehicle) to provide battery charging proposal information based on an energy injection cost, a consumable inspection period, and/or energy balancing. The information providing device 100 may monitor a travel distance of the vehicle, the energy injection cost (an energy cost), and/or a powertrain consumable replacement period (the inspection period). The information providing device 100 may provide the vehicle travel distance, the battery charging proposal information for recommending travel in the electric mode, and/or vehicle management information based on the monitored information. In addition, the information providing device 100 provides information on the energy cost for each unit distance to allow a driver to recognize an advantage and a necessity of the battery charging. Such information providing device 100 may include a communication device 110, a detection device 120, a memory 130, a user input device 140, a display device 150, and a processor 160.

The communication device 110 may support the information providing device 100 to perform communication with at least one of a server 200 and/or a user terminal 300. The communication device 110 may enable communication with electric control units (ECUs) mounted on the vehicle. The communication device 110 may use a vehicle communication technology and/or a wireless communication technology. As the vehicle communication technology, a controller area network (CAN), a media oriented systems transport (MOST) network, a local interconnect network (LIN), an Ethernet, and/or an X-by-Wire (a Flexray) may be used. As the wireless communication technology, a wireless Internet (e.g., a Wi-Fi), a short-range communication (e.g., a Bluetooth, a ZigBee, and an infrared communication), and/or a mobile communication may be used. As the communication device 110, a communication processor, a communication circuit, an antenna, and/or a transceiver may be used.

The server 200 may be a vehicle management server of a vehicle manufacturer, a navigation service server, and/or a financial institution server. Although not shown in the drawing, the server 200 may include a communication chip (a communication circuit), a processor, and a memory. The server 200 may provide energy injection price information such as a national average gas price and/or charging price, a gas price for each gas station, a charging price for each charging station, and/or a gas price and/or a charging price included in a payment history. The server 200 may collect the battery charging proposal information and/or vehicle management information from the information providing device 100 of the hybrid electric vehicle and manage the collected information. The server 200 may provide the battery charging proposal information and/or the vehicle management information to the user terminal 300 through the communication with the user terminal 300.

The user terminal 300, which is an electronic device capable of wireless and/or wired communication, may be implemented as a portable device such as a smartphone, a tablet, a personal digital assistant (PDA), a portable multimedia player (PMP), and/or a laptop computer. Although not shown in the drawing, such user terminal 300 may include a communication chip (a communication circuit), a user interface device, a processor, and a memory. The user terminal 300 may request information provision to the information providing device 100 or the server 200 using a dedicated application (app), a browser, or the like, receive the information provided from the information providing device 100, and display the received information on a display screen. In addition, the user terminal 300 may access a vehicle management server through the dedicated app, the browser, or the like. The user terminal 300 may receive the battery charging proposal information from the vehicle management server and output the battery charging proposal information. The user terminal 300 may always display the battery charging proposal information on a wallpaper in a form of a widget or the like based on menu selection of a user on an execution screen of the dedicated app.

The detection device 120 may detect (obtain) information such as a residual fuel amount and the state of charge (SOC). The detection device 120 may measure the residual fuel amount using a sensor (a measurement device) mounted in a fuel tank. The detection device 120 may identify the state of charge using a battery management system (BMS) and/or the sensor. The detection device 120 may measure the travel distance using a wheel speed sensor and/or a global positioning system (GPS). The detection device 120 may detect whether the engine has driven and/or whether the motor has driven from the EMS and/or the MCU through the communication device no.

The memory 130 may be a non-transitory storage medium that stores instructions executed by the processor 160. The memory 130 may be implemented as at least one of storage media (recording media) such as a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, web storage, and the like.

The memory 130 may store the information obtained by the detection device 120. The memory 130 may store information (e.g., the consumable inspection period or the like) set in advance. The memory 130 may temporarily store data input and/or output based on an operation of the processor 160. The memory 130 may store option information and the like selected (set) by the user.

The user input device 140 may generate data resulted from manipulation of the user. For example, the user input device 140 may generate data indicating on (activation) or off (deactivation) of a battery charging proposal function in response to a user input. The user input device 140 may be disposed on a steering wheel, a dashboard, a center fascia, and/or a door trim.

The display device iso, which is for outputting visual information, may include at least one of a liquid crystal display (LCD), a thin film transistor-liquid crystal display (Tyr-LCD), an organic light-emitting diode (OLED) display, a flexible display, a three-dimensional display (3D display), a transparent display, a head-up display (HUD), a touch screen, and/or a cluster. The display device 150 may include an audio output device such as a speaker capable of outputting audio data.

The user input device 140 and the display device 150 may be collectively referred to as a human interface device (HID).

The processor 160 may control an overall operation of the information providing device 100. The processor 160 may be implemented as at least one of an application specific integrated circuit (ASIC), a digital signal processor (DSP), a programmable logic device (PLD), a field programmable gate array (FPGA), a central processing unit (CPU), a microcontroller, and/or a microprocessor.

The processor 160 may determine whether a specific event that occurred in the vehicle satisfies an operation condition of the battery charging proposal function. The operation condition may be a case in which there is a vehicle power-on command input, a case in which there is a vehicle power-off command input, or a case in which there is a battery charging proposal function activation (operation) request. The specific event may be a vehicle power-on command, a vehicle power-off command, or a battery charg-ing proposal function activation request transmitted from the user input device 140, a vehicle remote control (e.g., a smart key), and/or the user terminal 300.

The processor 160 may obtain the residual fuel amount and/or the state of charge of the battery through the detection device 120. The processor 160 may obtain a total travel distance, a motor-used travel distance, and/or an engine-used travel distance of the vehicle. The processor 160 may obtain the total travel distance, the motor-used travel distance, the engine-used travel distance, and/or a hybrid mode travel distance from a travel distance measurement device (not shown) by using the communication device no. The travel distance measurement device may recognize a section in which the engine 10 and/or the motor 40 operates in association with the EMS and/or the MCU, and measure the distance traveled by the vehicle in the corresponding section. The processor 160 may directly calculate the total travel distance, the motor-used travel distance, and/or the engine-used travel distance in association with the EMS and/or the MCU without using the travel distance measurement device. In addition, the processor 160 may obtain the energy injection price information (the energy injection price) from the server 200, for example, the vehicle management server and/or the financial institution server. In addition, the processor 160 may obtain the energy injection price information in association with a navigation system mounted on the vehicle. The navigation system may receive the energy injection price information from the navigation service server.

The processor 160 may calculate, based on the obtained information, a total energy injection cost for each unit distance (a total energy injection cost), a fuel injection cost for each unit distance (a fuel injection cost), and/or an electric charging cost for each unit distance (an electric charging cost). In addition, the processor 160 may output the battery charging proposal information by calculating the recommended number of battery charging or the like for reducing the total energy injection cost. The recommended number of battery charging is the number of times the battery is fully charged.

The processor 160 may calculate a fuel injection cost EDC for each unit distance (e.g., 1 mile, 1 km, or the like) using [Equation 1].

$$EDC = \frac{EC - EA \times EB}{ED} \qquad \text{[Equation 1]}$$

Here, EA is the residual fuel amount, EB is the gas price, EC is the total gas cost at a current time point, and ED is a distance traveled in a state in which the engine is operating, that is, the engine-used travel distance. As the EB, a current time point national average gas price provided from the vehicle management server of the vehicle manufacturer, the gas price included in gas station information provided from the navigation system (the navigation service server), or the gas price included in payment information provided from the financial institution server may be used. The EC may be updated in real time using the EA and the EB. When determining whether the engine is in the operating state (the engine operating state), a case in which the motor 40 generates electricity by the engine 10 may be determined as the engine operating state because the fuel is used, and a case of the regenerative braking may be determined as an engine non-operating state because the fuel is cut.

The processor 160 may calculate an electric charging cost MDC for each unit distance using [Equation 2].

$$MDC = \frac{MC - MA \times MB}{MD} \quad \text{[Equation 2]}$$

Here, MA is the state of charge, MB is the electric charging price, MC is a current time point total charging cost, and MD is a distance traveled in a state in which the motor is driving, that is, the motor-used travel distance. As the MB, a current time point national average electric charging price provided from the vehicle management server, the electric charging price included in charging station information provided from the navigation system, the electric charging price included in the payment information provided from the financial institution server, or the like may be used. The MC may be updated in real time using the MA and the MB. When determining whether the motor 40 is in the driving state (the motor driving state), a case in which the motor 40 is driven during the regenerative braking may be excluded without being determined as the motor driving state. This is because, during the regenerative braking, the battery "B" is charged using the electric energy generated by the motor 40, so that the charging cost does not occur.

The processor 160 may calculate the total energy injection cost for each unit distance using [Equation 3].

$$TDC = \frac{TC}{ED + MD} \quad \text{[Equation 3]}$$

Here, TC, which is a current time point total energy injection cost, is 'EC−(EA×EB)+MC−(MA×MB)'.

The processor 160 may calculate the recommended number of battery charging for reducing the total energy injection cost. The processor 160 may identify an EDC reduction percentage previously stored in the memory 130. The EDC reduction percentage may be arbitrarily determined by a developer based on a market situation and a system development level, or may be determined based on option selection of the user. The processor 160 may determine a target TDC based on the EDC reduction percentage compared to an existing EDC. For example, when the EDC reduction percentage is 50%, the processor 160 may determine the target TDC as 'EDC×0.5'.

The processor 160 may calculate the recommended number of battery charging for satisfying the target TDC. To this end, the target TDC, that is, a target total energy injection cost $TDC_{target}$ may be expressed as [Equation 4] using [Equation 3].

$$TDC_{target} = \frac{TC + x}{ED + MD + y} \quad \text{[Equation 4]}$$

Here, x is an additional electric charging cost, and y is an additional motor-used travel distance. Because x is 'MDC×y', when inputting 'MDC×y' into [Equation 4] and organizing the equation with respect to y, an equation may be obtained and the obtained equation may be expressed as [Equation 5].

$$y = \frac{TC - TDC_{target}(ED + MD)}{TDC_{target} - MDC} \quad \text{[Equation 5]}$$

Subsequently, the processor 160 may calculate the recommended number of battery charging by dividing the additional motor-used travel distance y by a travelable distance in a battery full-charged state. The processor 160 may calculate the number of battery charging days for each week (days/week) in consideration of a travel distance for each day, the travelable distance in the battery full-charged state, and/or the electric charging cost.

The processor 160 may output the calculated total energy injection cost, the fuel injection cost, the electric charging cost, and/or the recommended number of battery charging on the display device 150. The processor 160 may transmit the calculated total energy injection cost, fuel injection cost, electric charging cost, and/or recommended number of battery charging to the server 200 and/or the user terminal 300 using the communication device no.

The processor 160 may output the powertrain consumable inspection (replacement) period on the display device 150 based on the travel distance of the vehicle. The processor 160 may display a replacement period of an engine-related consumable such as engine oil, an engine oil filter, a spark plug, an air cleaner, and/or an engine belt based on the engine-used travel distance. In addition, the processor 160 may display a replacement period of a motor-related consumable such as the motor, an inverter, and/or the battery based on the motor-used travel distance. The processor 160 may consider the consumable replacement period when proposing the recommended number of battery charging.

In terms of powertrain consumable management, the processor 160 may calculate how advantageous the travel using the motor 40 is at a time point of powertrain consumable replacement and display the calculated information as the battery charging proposal information. For example, when an average remaining distance for a replacement of the engine-related consumable EOAB is 10,000 km and an average remaining distance for a replacement of the motor-related consumable is 60,000 km, the processor 160 may display 'advantageous in remaining distance by 50,000 km' or '3 times advantageous in time point of engine-related consumable replacement (=(EOAB−MMIB)/EOAB× 100%×inspection motor-related consumable/inspection engine-related consumable)' in terms of the replacement of the motor-related consumable compared to the engine-related consumable.

The processor 160 may provide energy balancing information of the engine and the motor based on the travel distance. In addition, the processor 160 may propose the recommended number of battery charging based on the energy balancing information.

The processor 160 may calculate engine fuel injection energy, motor electric input energy, and vehicle total input energy. In this connection, the engine fuel injection energy may be obtained by multiplying a total fuel injection amount and power for each unit fuel, where the motor electric input energy is a total electric charging amount, and the vehicle total input energy is the sum of the engine fuel injection energy and the motor electric input energy. The processor 160 may calculate a ratio of the engine fuel injection energy to the vehicle total input energy as fuel injection balancing EBS. The processor 160 may calculate a ratio of the motor electric input energy to the vehicle total input energy as electric charging balancing MBS. When the fuel injection balancing EBS and the electric charging balancing MBS are compared to each other and the fuel injection balancing EBS is greater than the electric charging balancing MBS, the processor 160 may determine that additional battery charging is required as much as 'EBS-MBS'. The processor 160 may output information suggesting the additional battery charging. In one example, when the fuel injection balancing EBS is smaller than the electric charging balancing MBS, the processor 160 may determine that the additional battery charging proposal is unnecessary. For example, when the EBS is 51% and the MBS is 49%, the processor 160 may display a message indicating that 2% additional battery charging is required on the screen of the display device iso.

The processor 160 may reflect predetermined weights % respectively to the energy injection cost-based recommended number of battery charging, the consumable replacement period-based recommended number of battery charging, and the energy balancing information-based recommended number of battery charging to calculate an average value. The processor 160 may determine the calculated average value as the recommended number of battery charging. The processor 160 may display the determined recommended number of battery charging on the screen of the display device 150.

The processor 160 may always display or not display the battery charging proposal information (e.g., the recommended number of battery charging) on the wallpaper of the display device 150 even during the vehicle travel. In addition, the processor 160 may display the battery charging proposal information in response to a request of the user even during the vehicle travel.

Figure 3:
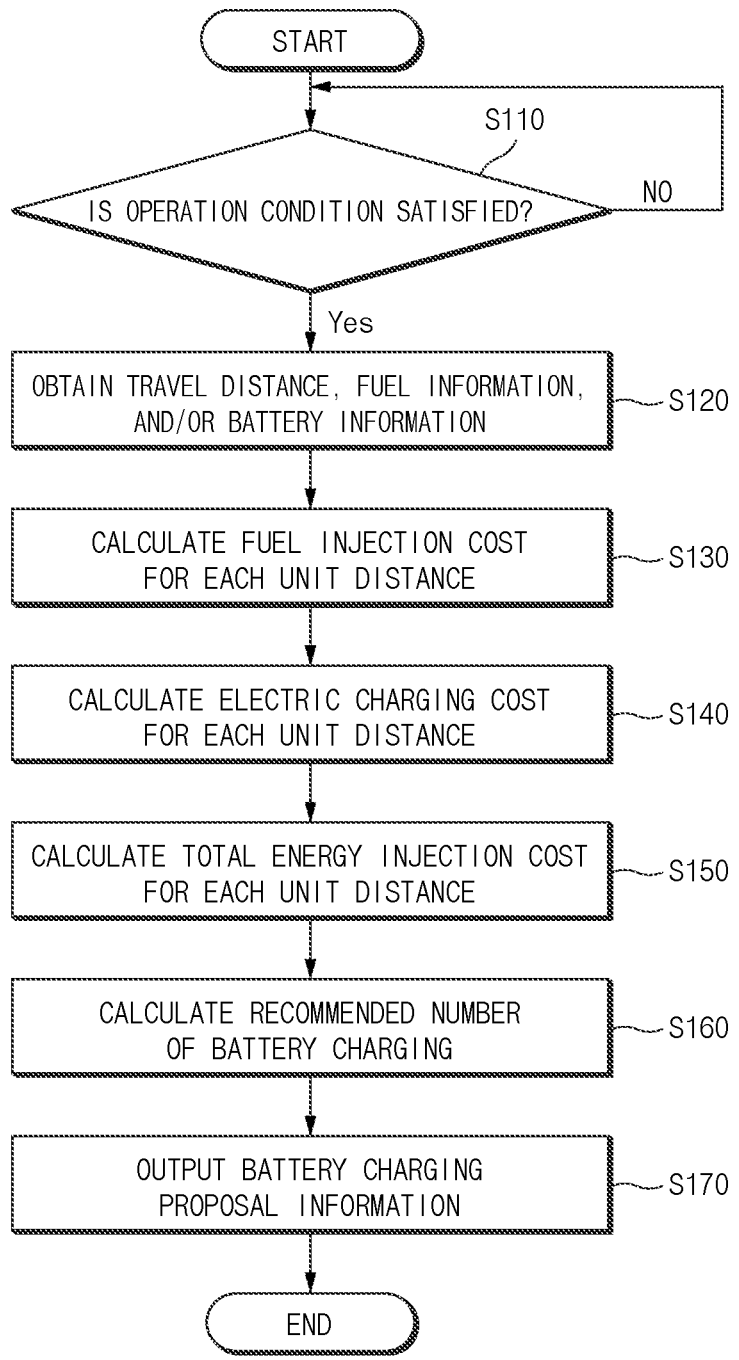
FIG. 3 is a flowchart illustrating a method for providing information for a hybrid electric vehicle according to embodiments of the present disclosure.

FIG. 3 is a flowchart illustrating a method for providing information for a hybrid electric vehicle according to embodiments of the present disclosure.

The processor 160 may determine whether the specific event that occurred in the vehicle satisfies the operation condition of the battery charging proposal function (S110). The operation condition may be the case in which there is the vehicle power-on command input, the case in which there is the vehicle power-off command input, or the case in which there is the battery charging proposal function activation (operation) request.

The processor 160 may obtain the travel distance information, the fuel information, and/or the battery information (S120). The processor 160 may obtain the travel distance information, the fuel information, and/or the battery information through the communication device no and/or the detection device 120. The travel distance information may include the total travel distance of the vehicle (the distance traveled using at least one of the engine and the motor), the motor-used travel distance, and/or the engine-used travel distance. The fuel information may include the residual fuel amount and/or the fuel price. The battery information may include the state of charge of the battery and/or the electric charging price. The fuel price and the electric charging price may be collectively referred to as the energy injection price.

The processor 160 may calculate the fuel injection cost for each unit distance based on the travel distance information and/or the fuel information (S130). The processor 160 may calculate the fuel injection cost using [Equation 1].

The processor 160 may calculate the electric charging cost for each unit distance based on the travel distance information and/or the battery information (S140). The processor 160 may calculate the electric charging cost using [Equation 2].

The processor 160 may calculate the total energy injection cost for each unit distance based on the travel distance information, the fuel information, and/or the battery information (S150). The processor 160 may calculate the total energy injection cost using [Equation 3].

The processor 160 may calculate the recommended number of battery charging based on the fuel injection cost, the electric charging cost, and/or the total energy injection cost (S160). The processor 160 may calculate the recommended number of battery charging using [Equation 4] and [Equation 5]. The processor 160 may determine the target total energy injection cost $TDC_{target}$ using the fuel injection cost. The processor 160 may calculate an additional distance to be traveled using the motor, that is, the additional motor-used travel distance, to maintain the target total energy injection cost. The processor 160 may calculate the recommended number of battery charging using the additional motor-used travel distance and the travelable distance in the battery full-charged state.

The processor 160 may output the recommended number of battery charging as the battery charging proposal information (S170). The processor 160 may also display the total energy injection cost, the fuel injection cost, and/or the electric charging cost when outputting the battery charging proposal information. In addition, the processor 160 may transmit the battery charging proposal information to the server 200 and/or the user terminal 300 using the communication device no.

Figure 4:
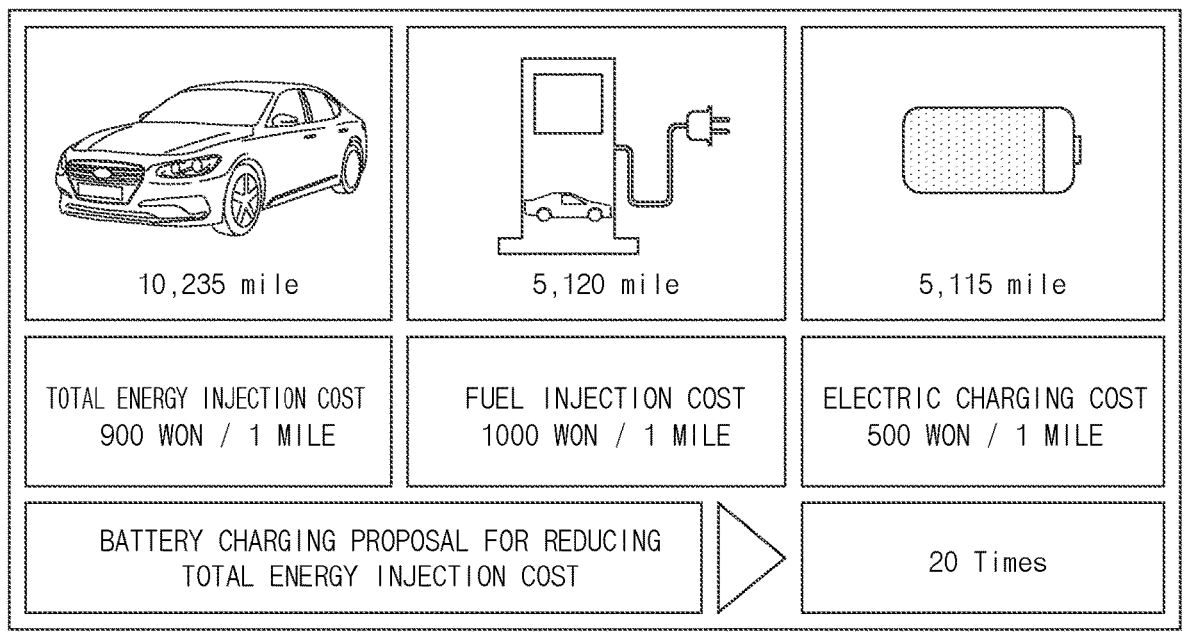
FIG. 4 is an exemplary view illustrating a screen displaying energy injection cost-based battery charging proposal information according to embodiments of the present disclosure.

FIG. 4 is an exemplary view illustrating a screen displaying energy injection cost-based battery charging proposal information according to embodiments of the present disclosure.

Referring to FIG. 4, on the screen of the display device 150, the total travel distance of the vehicle, the engine-used travel distance, the motor-used travel distance, the total energy injection cost, the fuel injection cost, the electric charging cost and the recommended number of battery charging may be displayed. The processor 160 may additionally display the recommended number of battery charging only when the battery charging proposal function is turned on.

Figure 5:
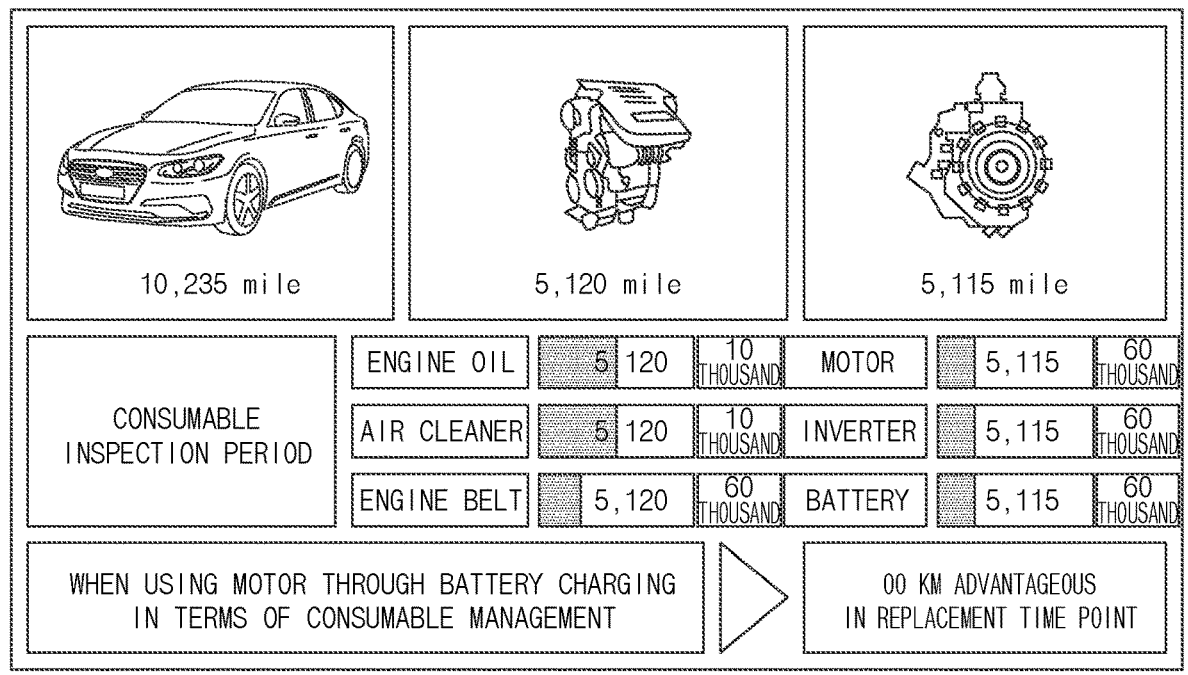
FIGS. 5 and 6 are exemplary diagrams illustrating a screen displaying consumable replacement period-based battery charging proposal information according to embodiments of the present disclosure.
Figure 6:
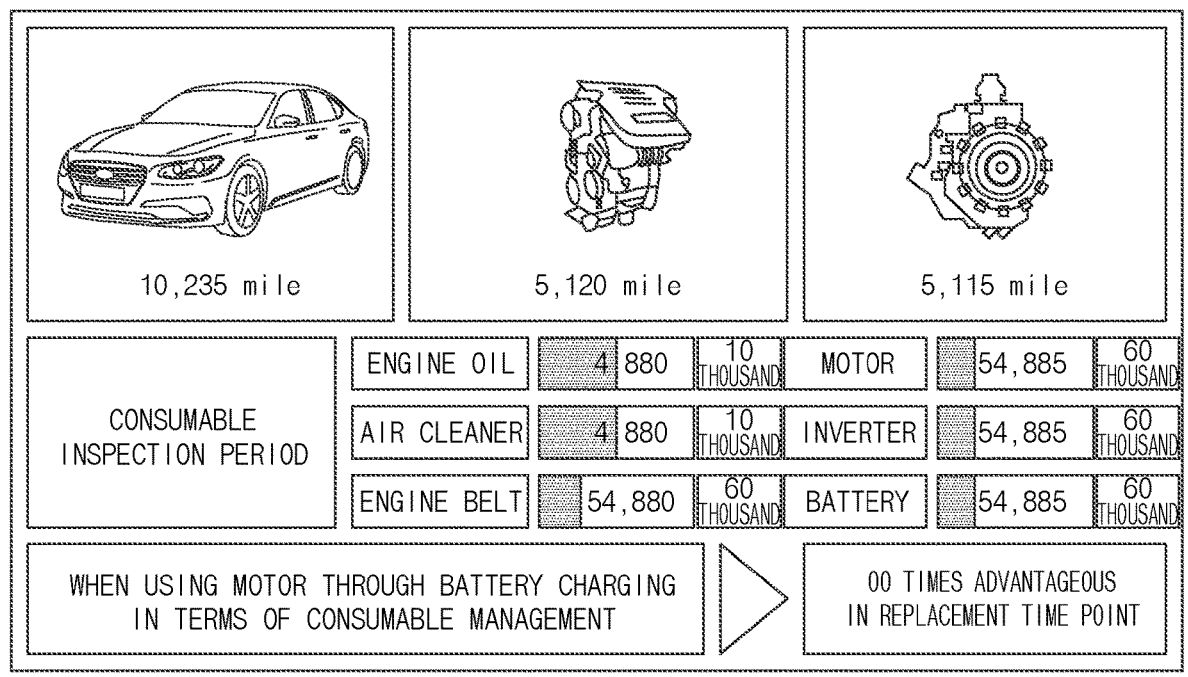

FIGS. 5 and 6 are exemplary diagrams illustrating a screen displaying consumable replacement period-based battery charging proposal information according to embodiments of the present disclosure.

The processor 160 may visually display on the display device 150 whether the replacement period and/or the replacement time point of the powertrain consumable has come. The processor 160 may visually display the remaining distance for the replacement period and the replacement time point of the engine-related consumable such as the engine oil, the air cleaner, and/or the engine belt based on the engine-used travel distance. In addition, the processor 160 may display a remaining distance for the replacement period and the replacement time point of the motor-related consumable such as the motor, the inverter, the battery, and the like based on the motor-used travel distance. The processor 160 may quantify how advantageous the consumable replacement time point is when using the motor through the battery charging compared to when using the engine in terms of the consumable management, and may provide the quantified information as the battery charging proposal information. A degree of advantage when using the motor in terms of the consumable replacement time point may be expressed as the travel distance as shown in FIG. 5 or as a percentage (e.g., 2 times, 200%, or the like) as shown in FIG. 6.

Figure 7:
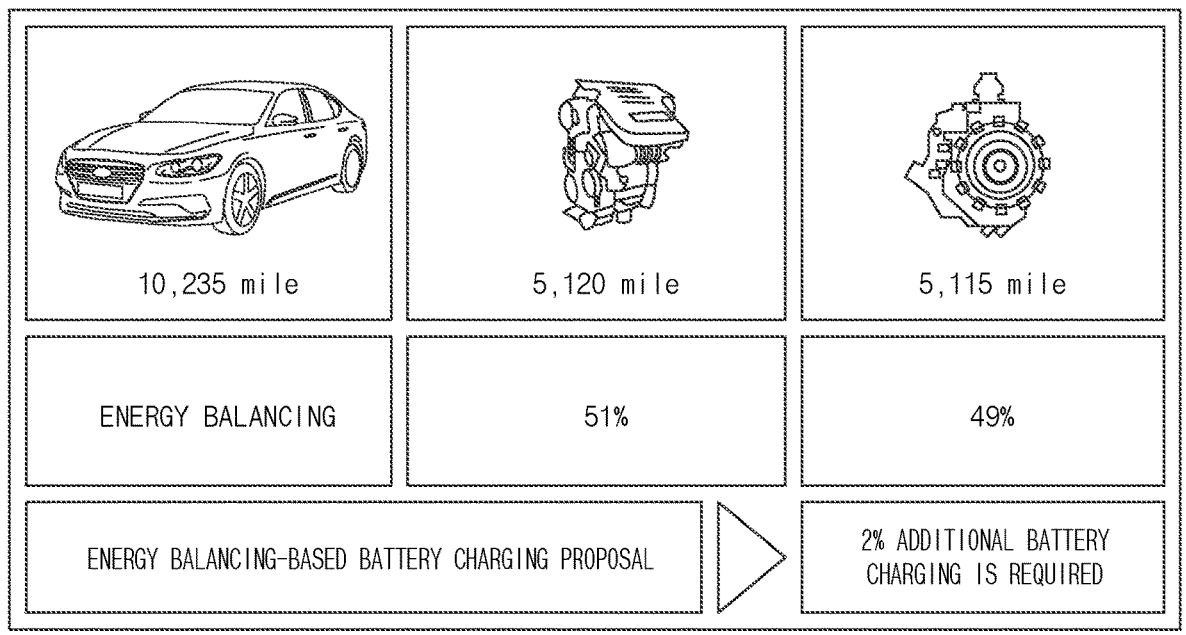
FIG. 7 is an exemplary view illustrating a screen displaying energy balancing-based battery charging proposal information according to embodiments of the present disclosure.

FIG. 7 is an exemplary view illustrating a screen displaying energy balancing-based battery charging proposal information according to embodiments of the present disclosure.

Referring to FIG. 7, the processor 160 may display 51% and 49%, which are respectively usage percentages of the engine and the motor in terms of the energy balancing. The processor 160 may provide the battery charging proposal information when the usage percentage of the engine is higher than that of the motor. The processor 160 may calculate and display a battery charging percentage additionally required in terms of the energy balancing.

Figure 8:
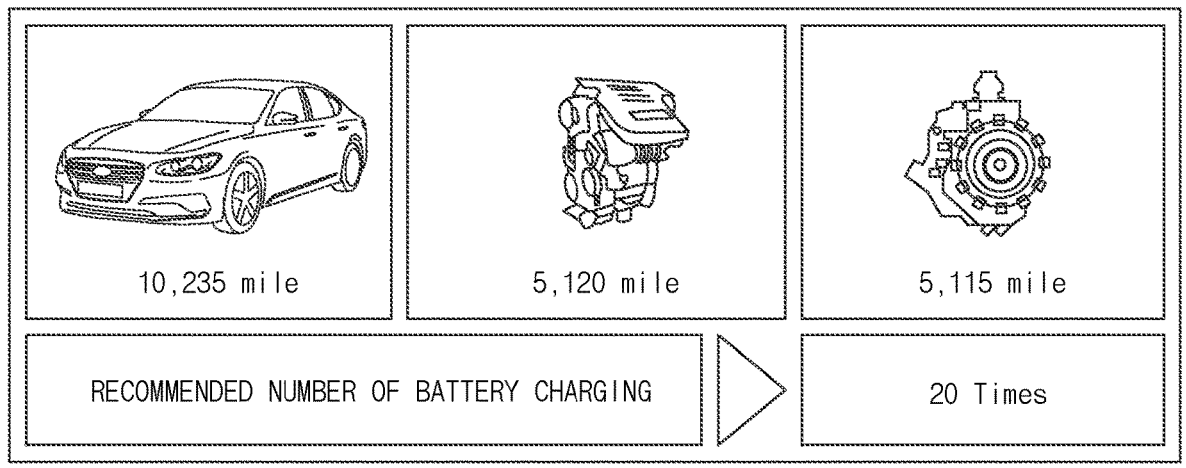
FIG. 8 is an exemplary diagram illustrating a screen displaying efficiency-based battery charging proposal information according to embodiments of the present disclosure.

FIG. 8 is an exemplary diagram illustrating a screen displaying efficiency-based battery charging proposal information according to embodiments of the present disclosure.

The processor 160 may reflect the predetermined percentages (the weights) respectively to the energy injection cost-based recommended number of battery charging, the consumable replacement period-based recommended number of battery charging, and the energy balancing information-based recommended number of battery charging to calculate the average value, thereby obtaining the recommended number of battery charging. The processor 160 may display the obtained recommended number of battery charging on the screen of the display device iso.

Figure 9:
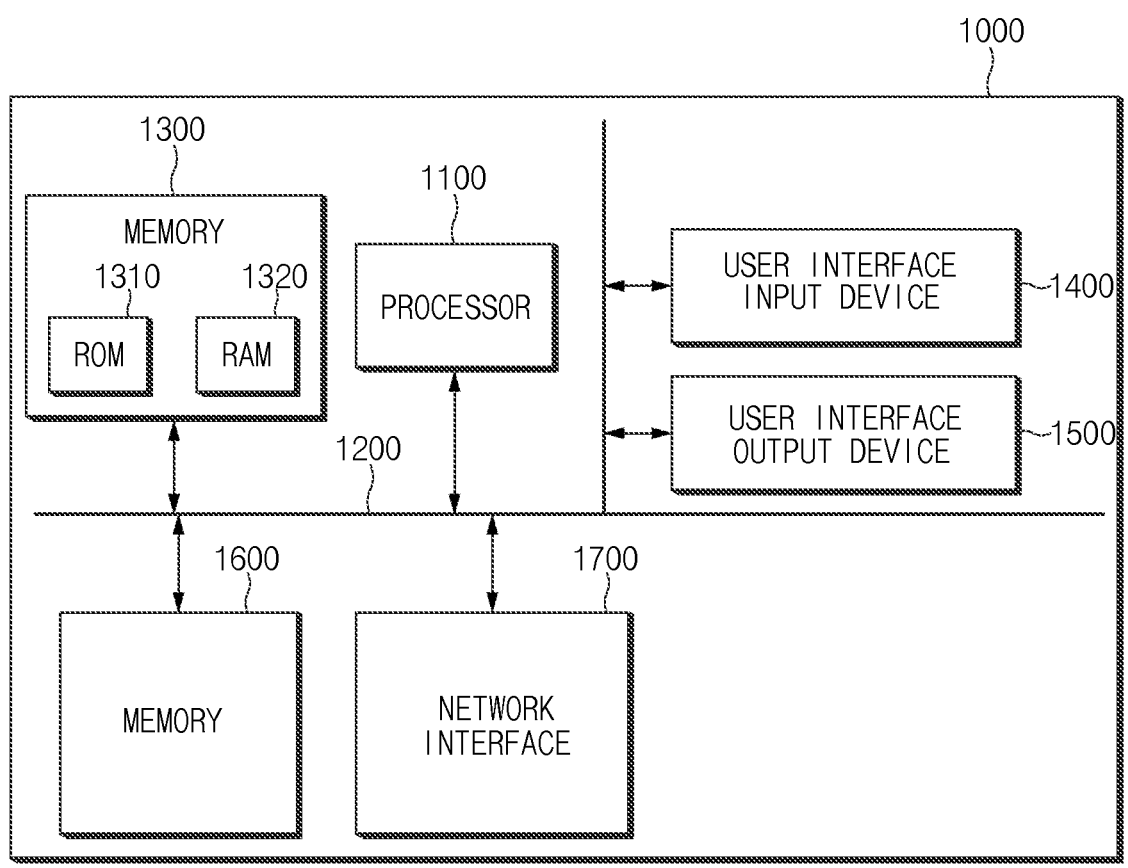
FIG. 9 is a block diagram illustrating a computing system executing a method for providing information for a hybrid electric vehicle according to embodiments of the present disclosure.

FIG. 9 is a block diagram illustrating a computing system executing a method for providing information for a hybrid electric vehicle according to embodiments of the present disclosure.

With reference to FIG. 9, a computing system 1000 may include at least one processor 1100, a memory 1300, a user interface input device 1400, a user interface output device 1500, a memory (i.e., storage) 1600, and a network interface 1700 connected via a bus 1200.

The processor 1100 may be a central processing unit (CPU) or a semiconductor device that performs processing on commands stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the memory 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure. Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

According to embodiments of the present disclosure, the battery charging proposal information is provided based on the energy injection cost, the consumable inspection period, and/or the energy balancing for the balanced use of the motor and the engine in the hybrid electric vehicle, thereby inducing an increase of the electric mode travel distance.

According to embodiments of the present disclosure, stable vehicle management, and reasonable durability management and consumable replacement expenditure of the powertrain parts (consumables) and the like may be possible, and thus the driver may participate in a flow of strengthening regulations in environmental issues and the fuel efficiency.

According to embodiments of the present disclosure, the driver may make a battery charging plan in consideration of the battery charging proposal information before the travel.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for providing information for a hybrid electric vehicle, the device comprising:
   a display device;
   a non-transitory memory; and
   a processor connected to the display device and the non-transitory memory, wherein the processor is configured to:
   obtain travel distance information, fuel information, and battery information of the vehicle;
   output, on the display device, battery charging proposal information based on at least one of an energy injection cost, a consumable replacement period, or energy balancing based on the obtained travel distance information, fuel information, and battery information of the vehicle; and
   output, on the display device, information indicating that additional battery charging is required based on ratio of engine fuel injection energy and motor electric input energy to vehicle total input energy.

2. The device of claim 1, wherein the processor is configured to calculate a fuel injection cost for each unit distance using an engine-used travel distance and a residual fuel amount and a fuel injection price included in the fuel information.

3. The device of claim 2, wherein the processor is configured to calculate an electric charging cost for each unit distance using a motor-used travel distance and a state of charge of a battery and an electric charging price included in the battery information.

4. The device of claim 3, wherein the processor is configured to calculate a total energy injection cost for each unit distance using a total travel distance of the vehicle, the fuel injection cost, and the electric charging cost.

5. The device of claim 4, wherein the processor is configured to:
   determine a target total energy injection cost based on the fuel injection cost;
   calculate an additional motor-used travel distance for achieving the target total energy injection cost; and calculate a recommended number of battery charging using the additional motor-used travel distance and a travelable distance in a battery full-charged state.

6. The device of claim 5, wherein the processor is configured to obtain a national average fuel injection price and a national average electric charging price from a vehicle management server.

7. The device of claim 5, wherein the processor is configured to obtain the fuel injection price included in gas station information and the electric charging price included in charging station information in association with a navigation system.

8. The device of claim 5, wherein the processor is configured to obtain the fuel injection price and the electric charging price included in a payment history from a financial institution server.

9. A device for providing information for a hybrid electric vehicle, the device comprising:
a display device;
a non-transitory memory; and
a processor connected to the display device and the non-transitory memory, wherein the processor is configured to:
obtain travel distance information, fuel information, and battery information of the vehicle;
output, on the display device, battery charging proposal information based on at least one of an energy injection cost, a consumable replacement period, or energy balancing based on the obtained travel distance information, fuel information, and battery information of the vehicle;
display a replacement period of an engine-related consumable based on an engine-used travel distance;
display a replacement period of a motor-related consumable based on a motor-used travel distance; and
quantify and display how advantageous travel using a motor is compared to travel using an engine in terms of the replacement periods of the engine-related consumable and the motor-related consumable.

10. The device of claim 1, wherein the processor is configured to:
calculate a first ratio of the engine fuel injection energy to the vehicle total input energy;
calculate a second ratio of the motor electric input energy to the vehicle total input energy;
compare the first ratio and the second ratio with each other; and
display the information indicating that the additional battery charging is required based on a difference between the first ratio and the second ratio when the first ratio is greater than the second ratio.

11. The device of claim 1, wherein the processor is configured to:
reflect predetermined weights to an energy injection cost-based recommended number of battery charging, a consumable replacement period-based recommended number of battery charging, and an energy balancing information-based recommended number of battery charging, respectively, to calculate an average value; and
display the calculated average value as a recommended number of battery charging.

12. A method for providing information for a hybrid electric vehicle, the method comprising:
obtaining information including travel distance information, fuel information, and battery information; and
outputting battery charging proposal information based on at least one of an energy injection cost, a consumable replacement period, or energy balancing using the obtained travel distance information, fuel information, and battery information, wherein outputting the battery charging proposal information comprises displaying information indicating that additional battery charging is required based on ratio of engine fuel injection energy and motor electric input energy to vehicle total input energy.

13. The method of claim 12, wherein obtaining the information comprises:
measuring an engine-used travel distance, a motor-used travel distance, and a total travel distance using a travel distance measurement device;
obtaining a residual fuel amount of the fuel information and a state of charge of a battery of the battery information; and
obtaining a fuel injection price of the fuel information and an electric charging price of the battery information.

14. The method of claim 13, wherein obtaining the fuel injection price and the electric charging price comprises obtaining a national average fuel injection price and a national average electric charging price from a vehicle management server.

15. The method of claim 13, wherein obtaining the fuel injection price and the electric charging price comprises obtaining the fuel injection price included in gas station information and the electric charging price included in charging station information in association with a navigation system.

16. The method of claim 13, wherein obtaining the fuel injection price and the electric charging price comprises obtaining the fuel injection price and the electric charging price included in a payment history from a financial institution server.

17. The method of claim 13, wherein outputting the battery charging proposal information comprises:
calculating a fuel injection cost for each unit distance using the engine-used travel distance, the residual fuel amount, and the fuel injection price;
calculating an electric charging cost for each unit distance using the motor-used travel distance, the state of charge of the battery, and the electric charging price; and
calculating a total energy injection cost for each unit distance using the total travel distance, the fuel injection cost, and the electric charging cost.

18. The method of claim 17, wherein outputting the battery charging proposal information further comprises:
determining a target total energy injection cost based on the fuel injection cost;
calculating an additional motor-used travel distance for achieving the target total energy injection cost; and
calculating a recommended number of battery charging using the additional motor-used travel distance and a travelable distance in a battery full-charged state.

19. The method of claim 13, wherein outputting the battery charging proposal information comprises:
displaying a replacement period of an engine-related consumable based on the engine-used travel distance;
displaying a replacement period of a motor-related consumable based on the motor-used travel distance; and
quantifying and displaying how advantageous travel using a motor is compared to travel using an engine in terms of the replacement periods of the engine-related consumable and the motor-related consumable.

20. The method of claim 13, wherein outputting the battery charging proposal information comprises:
- calculating a first ratio of the engine fuel injection energy to the vehicle total input energy;
- calculating a second ratio of the motor electric input energy to the vehicle total input energy;
- comparing the first ratio and the second ratio with each other; and
- displaying the information indicating that the additional battery charging is required based on a difference between the first ratio and the second ratio when the first ratio is greater than the second ratio.

* * * * *